US010963708B2

(12) United States Patent
Schack et al.

(10) Patent No.: US 10,963,708 B2
(45) Date of Patent: Mar. 30, 2021

(54) METHOD, DEVICE AND COMPUTER-READABLE STORAGE MEDIUM WITH INSTRUCTIONS FOR DETERMINING THE LATERAL POSITION OF A VEHICLE RELATIVE TO THE LANES OF A ROAD

(71) Applicant: Volkswagen Aktiengesellschaft, Wolfsburg (DE)

(72) Inventors: Moritz Schack, Braunschweig (DE); Markus Kerper, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 136 days.

(21) Appl. No.: 16/320,359

(22) PCT Filed: Jun. 13, 2017

(86) PCT No.: PCT/EP2017/064380
§ 371 (c)(1),
(2) Date: Jan. 24, 2019

(87) PCT Pub. No.: WO2018/019465
PCT Pub. Date: Feb. 1, 2018

(65) Prior Publication Data
US 2019/0266419 A1  Aug. 29, 2019

(30) Foreign Application Priority Data
Jul. 27, 2016  (DE) ..................... 10 2016 213 817.0

(51) Int. Cl.
*G06K 9/03* (2006.01)
*G06K 9/00* (2006.01)
(Continued)

(52) U.S. Cl.
CPC ....... *G06K 9/00798* (2013.01); *G05D 1/0088* (2013.01); *G05D 1/0246* (2013.01);
(Continued)

(58) Field of Classification Search
CPC ........ G06K 9/00798; G06K 9/03; G06T 7/73; G06T 7/248; G06T 2207/10016;
(Continued)

(56) References Cited

U.S. PATENT DOCUMENTS

| 8,996,197 B2 | 3/2015 | Joh et al. ..................... 701/1 |
| 9,151,626 B1 | 10/2015 | Kojo |

(Continued)

FOREIGN PATENT DOCUMENTS

| DE | 102012104786 A1 | 12/2012 | ............ B60W 30/12 |
| DE | 102014203965 A1 | 12/2014 | ............ B60W 40/04 |

(Continued)

OTHER PUBLICATIONS

German Office Action, Application No. 102016213817.0, 6 pages, dated Mar. 30, 2017.

(Continued)

*Primary Examiner* — Sheela C Chawan
(74) *Attorney, Agent, or Firm* — Slayden Grubert Beard PLLC

(57) ABSTRACT

The invention relates to a method, a device (20, 30) and a computer-readable storage medium with instructions for determining the lateral position of a vehicle relative to the lanes of a road. An image processing unit (22) detects (10) road markings. A position-determining unit (23) determines (11) a starting position for the vehicle. A processing unit (24) determines (12) points of intersection of a line which is orthogonal to the vehicle movement and the detected road markings. The processing unit (24) determines (13) in addition points of intersection of the orthogonal line and (Continued)

road markings from a lane geometry map for the starting position determined for the vehicle, the points of intersection being filtered. An evaluation unit (25) finally determines (14) the lateral position of the vehicle by comparing the determined points of intersection.

13 Claims, 6 Drawing Sheets

(51) Int. Cl.
*G06T 7/246* (2017.01)
*G05D 1/00* (2006.01)
*G05D 1/02* (2020.01)
*G06T 7/73* (2017.01)

(52) U.S. Cl.
CPC .............. *G06K 9/03* (2013.01); *G06T 7/248* (2017.01); *G06T 7/73* (2017.01); *G05D 2201/0213* (2013.01); *G06T 2207/10016* (2013.01); *G06T 2207/20016* (2013.01); *G06T 2207/30256* (2013.01)

(58) Field of Classification Search
CPC ........... G06T 2207/20016; G06T 2207/30256; G05D 1/0088; G05D 1/0246; G05D 2201/0213
USPC ....... 382/104, 100, 151, 168, 171, 172, 181, 382/190, 199, 216, 218, 254, 260, 266, 382/300; 701/23, 117, 1, 532, 3.14, 408, 701/509, 534, 535
See application file for complete search history.

(56) References Cited

U.S. PATENT DOCUMENTS

| | | | |
|---|---|---|---|
| 10,301,783 B2 * | 5/2019 | Dolinar | ................... E01C 23/22 |
| 2012/0314070 A1 | 12/2012 | Zhang et al. | ................. 348/148 |
| 2013/0052614 A1 | 2/2013 | Mollicone et al. | ............. 434/65 |
| 2014/0257686 A1 | 9/2014 | Feldman et al. | .............. 701/300 |
| 2014/0358321 A1 | 12/2014 | Ibrahim | ........................... 701/1 |
| 2016/0187887 A1 | 6/2016 | Ferguson et al. | ............... 701/28 |

FOREIGN PATENT DOCUMENTS

| | | | | |
|---|---|---|---|---|
| DE | 102014211450 A1 | 12/2014 | ............ B60W 30/12 |
| DE | 102016213782 A1 | 2/2018 | ............ B60W 30/12 |
| DE | 102016213817 A1 | 2/2018 | ............ B60W 30/12 |
| EP | 1686538 A2 | 8/2006 | ............ G06T 17/05 |
| EP | 2633270 B1 | 5/2015 | ............ G01C 21/32 |
| EP | 2878975 A1 | 6/2015 | ............ G01S 19/40 |
| EP | 2899669 A1 | 7/2015 | ............. G06K 9/00 |
| EP | 2918974 A1 | 9/2015 | ............ G01C 21/36 |
| WO | 2008/150002 A1 | 12/2008 | ............. G06K 9/00 |
| WO | 2013/133752 A1 | 9/2013 | ............ B60W 30/12 |
| WO | WO-2013133752 A * | 9/2013 | ............ B60W 30/12 |
| WO | 2018/019464 A1 | 2/2018 | ............ G01C 21/36 |
| WO | 2018/019465 A1 | 2/2018 | ............. G06K 9/00 |

OTHER PUBLICATIONS

German Office Action, Application No. 102016213817.0, 5 pages, dated Sep. 5, 2017.
International Search Report and Written Opinion, Application No. PCT/EP2017/064380, 10 pages, dated Sep. 27, 2017.
International Search Report and Written Opinion, Application No. PCT/EP2017/064379, 9 pages, dated Oct. 6, 2017.

* cited by examiner

METHOD, DEVICE AND COMPUTER-READABLE STORAGE MEDIUM WITH INSTRUCTIONS FOR DETERMINING THE LATERAL POSITION OF A VEHICLE RELATIVE TO THE LANES OF A ROAD

CROSS-REFERENCE TO RELATED APPLICATIONS

This application claims priority to German Patent Application No. DE 10 2016 213 817.0, filed with the German Patent and Trademark Office on Jul. 27, 2016. The contents of the aforesaid German Patent Application are incorporated herein in their entireties for all purposes.

TECHNICAL FIELD

The present invention relates to a method, a device, and a computer-readable storage medium with instructions for determining the lateral position of a vehicle relative to the lanes of a road, and in particular to determine a relative lateral position with sub-lane precision. The present invention furthermore relates to a vehicle with such a device.

BACKGROUND

Modern vehicles are becoming increasingly more autonomous, i.e., the vehicles provide the driver with increasingly more functions and systems that assist them in controlling the vehicle by instructions, or assume parts of the vehicle control. A great deal of information about the vehicle and its environment is needed for such functions and systems.

For the function of "lane-precise navigation", for example the knowledge of the lane is required on which the vehicle to be navigated, the "ego vehicle", is located. This lane is also described as an "ego lane". Moreover, in addition to the knowledge of the ego lane, more precise information regarding the transverse offset of the ego vehicle relative to the ego lane is required for automated driving and car-to-car-based applications. At all times, where the ego vehicle is located laterally relative to the lane must be known with sub-lane precision.

The document US 2014/0358321 A1 discloses a method for recognizing and tracking the borders of a traffic lane. The method uses maps with information for road geometry, GPS data, history data and the positions of other vehicles to determine the current position.

The document EP 2 899 669 A1 describes a method for determining the lateral position of a vehicle relative to the traffic lane of a road. With the assistance of a camera, geometric features of the traffic lanes are ascertained such as road markings. The ascertained features are classified and serve to determine position. Classification requires the classification unit to be trained.

The document DE 10 2012 104 786 A1 describes a system for precisely estimating a lane in which a vehicle travels. A system for lane ascertainment provides estimated lanes that are determined in different ways. Examples are lane markings detected by a camera, a guide vehicle or GPS/maps that are precise to the lane level. The estimated lanes are provided with confidence information. The estimated lanes and the corresponding confidence information are fused in order to produce an ascertained lane.

In summary, basically three solution approaches are pursued at present to determine the lateral position of a vehicle relative to a lane.

A first approach consists of the use of a very precisely measured digital lane geometry map with an absolute position in the centimeter range in conjunction with a very precise dual-frequency GPS system. In this context, the position in the map is determined with the assistance of the GPS sensor without additional imaging sensors. However frequently, an assignment of the ego vehicle to the correct lane is not possible given GPS and map imprecisions with regard to the absolute position. Moreover, a solution with a very precise map and very precise GPS is very expensive.

Another approach consists of the use of imaging sensors such as a camera system. This allows the assignment of the ego vehicle to the lane relative to lanes ascertained by the sensors. The use of imaging sensors without the simultaneous employment of a digital map however frequently leads to only one or two lanes being detected by the sensors. The positioning of the ego vehicle can then only be relative to the recognized lane, and not however relative to all lanes.

A third approach combines imaging sensors with map information regarding the number and marking type of the lanes. By using imaging sensors and the information from a digital map on how many lanes there are and their existing edge markings (dashed, continuous, . . . ), the ego vehicle can be assigned to all lanes. However, the precision of the transverse offset relative to the corresponding lane is insufficient for the aforementioned applications due to the spacing errors of the lane markings detected by the sensors relative to the ego vehicle.

SUMMARY

It is an object to provide a method and a device for determining a lateral position of a vehicle relative to the lanes of a road that enable determination of the relative lateral position with sub-lane precision.

This object is solved by a method having the features of the independent method claim and a device having the features of the independent apparatus claim, and by a computer-readable storage medium with instructions according to the respective independent claim. Some embodiments of the present invention are the subject matter of the dependent claims and the following description.

According to a first aspect of the invention, a method for determining a lateral position of a vehicle relative to the lanes of a road comprises the steps of:
  detecting road markings;
  determining a starting position for the vehicle;
  ascertaining points of intersection of a line orthogonal to the vehicle movement with the detected road markings;
  ascertaining points of intersection of the orthogonal line with road markings from a lane geometry map for the starting position determined for the vehicle, wherein the points of intersection are filtered; and
  determining the lateral position of the vehicle by comparing the ascertained points of intersection.

According to another aspect of the invention, a device for determining a lateral position of a vehicle relative to the lanes of a road has:
  an image processing unit for detecting road markings;
  a position-determining unit for determining a starting position for the vehicle;
  a processing unit for ascertaining points of intersection of a line which is orthogonal to the vehicle movement and the detected road markings and for ascertaining points of intersection of the orthogonal line with road markings from a lane geometry map for the starting position determined for the vehicle, wherein the processing unit is configured to undertake a filtering of the points of intersection when ascertaining the points of intersection of the orthogonal line with road markings from the lane geometry map; and an evaluation unit for determining the lateral position of the vehicle by comparing the ascertained points of intersection.

According to another aspect of the invention, a computer-readable storage medium contains instructions that, while being executed by a computer, cause the computer to execute the following steps:

detect road markings;

determine a starting position for the vehicle;

ascertain points of intersection of a line orthogonal to the vehicle movement with the detected road markings;

ascertain points of intersection of the orthogonal line with road markings from a lane geometry map for the starting position determined for the vehicle, wherein the points of intersection are filtered; and determine the lateral position of the vehicle by comparing the ascertained points of intersection.

DETAILED DESCRIPTION

Figure 1:
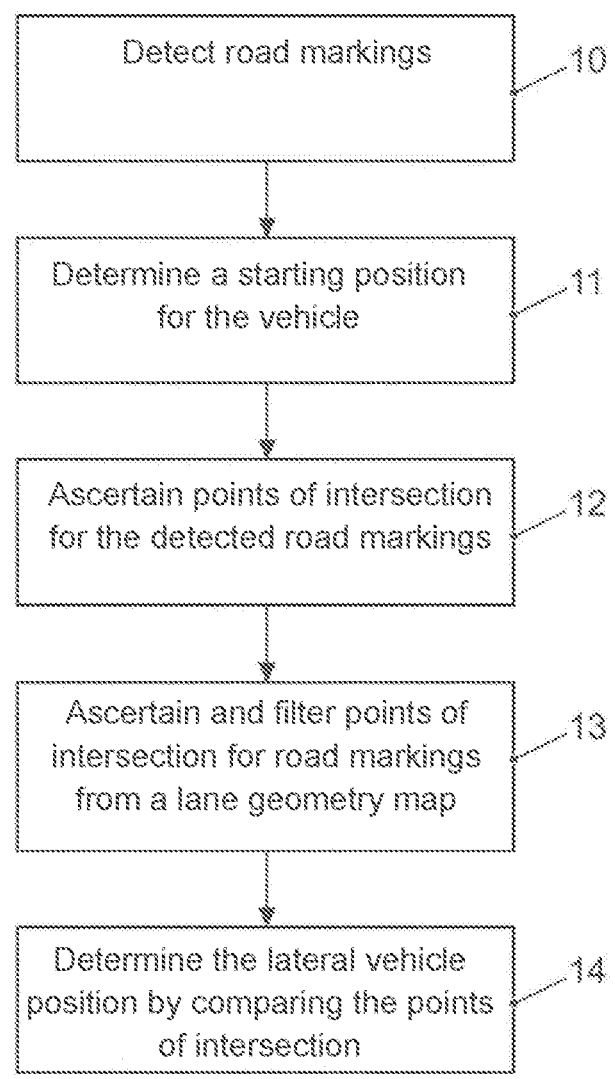
FIG. 1 schematically shows a method for determining a lateral position of a vehicle relative to the lanes of a road.

With the assistance of a camera system, road markings in some embodiments can be recognized and compared with the data of a digital map that contains all lane edge geometries and lane middle geometries with great precision relative to each other. For the comparison, first the points of intersection of a line orthogonal to the driving direction is determined with the recognized road markings. These are compared with the points of intersection of the same line with the road markings according to the map. The lateral position of the vehicle is then determined from the result.

Sometimes, the road traveled by the vehicle and the associated oncoming road overlap in the two-dimensional map geometry with traffic lanes from other roads, for example in the case of bridges and underpasses. In such a case and in some embodiments, only the map points of intersection for the traveled road, the associated oncoming road and, if applicable, associated accesses and exits should be ascertained, and the map points of intersection with the overlapping traffic lanes should be ignored. For this purpose, the map points of intersection are filtered during which the problematic map points of intersection are filtered out, and most of the relevant map points of intersection are simultaneously retained.

Points of intersection that are unintentionally filtered out are generally so far from the road that the camera typically would not detect any of these road markings at the locations of the unrecognized points of intersection. Likewise, unintentionally retained points of intersection are generally also located further from the camera than the relevant points of intersection for the comparison. These therefore also do not represent a problem.

According to some embodiments, the points of intersection are filtered based on the angles of direction of the points of intersection. In so doing, and in some embodiments, those points of intersection are filtered out whose angles of direction deviate by more than one angle filter threshold value from a route angle of the vehicle. A clear deviation of the angle of direction of a point of intersection from the route angle of the vehicle is a clear indication that the corresponding point of intersection belongs to an intersecting road, and not to the traveled road. Angle-based filtering makes it possible to easily ascertain such points of intersection. The use of an angle filter threshold value moreover ensures that relevant map points of intersection with deviating angles of direction, such as at accesses and exits, are retained.

In some embodiments, the angle filter threshold value depends on the road type. With an angle filter threshold value of about 20°, all potentially problematic map points of intersection of overlapping roads are generally filtered out on highways, but all relevant map points of intersection of accesses and exits and similar roads are, however, included. On other roads besides highways, the curve radii of accesses and exits and similar roads are generally so tight that an angle filter threshold value of at least 40° should be selected. The use of different angle filter threshold values for different road types makes it possible to adapt the filtering to the different architectural situations of the road types.

According to some embodiments, the points of intersection are filtered based on traffic lane groups of the lane geometry map. In this context and in some embodiments, only those points of intersection are retained that belong to a traffic lane group that belongs to the traveled road. If points of intersection to map geometries of a traffic lane group with intermediate points of intersection of another traffic lane group are on the orthogonal, and neither of the two traffic lane groups contains subsequent segments from the other one, these traffic lane groups must overlap. Accordingly, intersecting roads must be imaged on different planes.

If one of the overlapping lane groups belongs to the traveled lane group, map points of intersection of the traffic lane groups that overlap in this case can be ignored.

According to some embodiments, the points of intersection are filtered based on height information of the traffic lanes. In this case and in some embodiments, only those points of intersection are retained that belong to traffic lanes which are located at the same height as the traveled road. To the extent that the map data provide height information on the roads, it can be easily ascertained by comparing the height information which traffic lanes are at the same height as the traveled road. The points of intersection ascertained for traffic lanes other than these can be filtered out.

According to some embodiments, all points of intersection are rejected when filtering the points of intersection when there are overlapping roads in the lane geometry map. Instead, measures for preserving and interpolating information that has already been collected are performed in this approach. To the extent that overlapping roads only appear briefly and in particular when the vehicle movement can be estimated very precisely over short periods by using jump-free relative position information, the comparison of the points of intersection can be easily suspended briefly.

A method according to one or more of the preceding and following embodiments or a device according to one or more of the preceding and following embodiments may be used in an autonomous or manually controlled vehicle, in particular a motor vehicle.

Additional embodiments of the present invention can be derived from the following description of the FIGS. and the appended claims.

To better understand the present invention, further embodiments are be explained in the following in greater detail with reference to the figures. Of course, the invention is not restricted to these embodiments, and the described features can also be combined or modified without departing from the scope of the invention as defined in the appended claims.

FIG. 1 schematically shows a method for determining a lateral position of a vehicle relative to the lanes of a road. In a first step, road markings are detected 10. Moreover, a starting position of the vehicle is determined 11. Then points of intersection of a line orthogonal to the vehicle movement is ascertained using the detected road markings 12. Likewise, points of intersection of the orthogonal line are ascertained using road markings from a lane geometry map for the starting position determined for the vehicle 13. In doing so, the determined points of intersection are filtered.

For example, the points of intersection are filtered based on angles of direction of the points of intersection, based on traffic lane groups of the lane geometry map, or based on height information on the traffic lanes. Alternatively, all of the points of intersection are rejected in the case of overlapping roads in the lane geometry map. Finally, the lateral position of the vehicle is determined by comparing the ascertained points of intersection 14.

Figure 2:
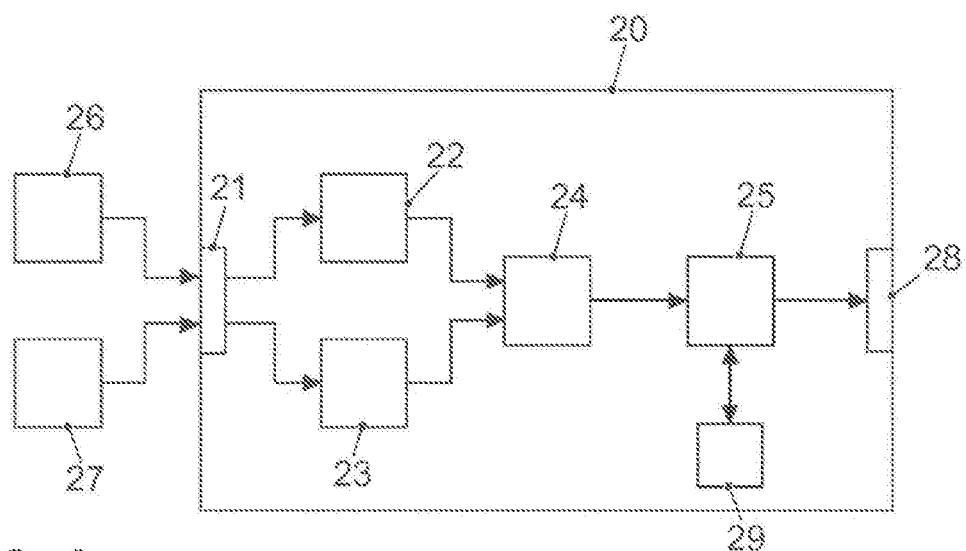
FIG. 2 shows a first exemplary embodiment of a device for determining a lateral position of a vehicle relative to the lanes of a road.

FIG. 2 shows a simplified schematic representation of a first exemplary embodiment of a device 20 for determining a lateral position of a vehicle relative to the lanes of a road. The device 20 has an image processing unit 22 for detecting 10 road markings. To this end, the image processing unit 22 uses for example image information from a camera unit 26 that is received through an input of the device 20. The device 20 moreover has a position determining unit 23 for determining 11 a starting position for the vehicle. The starting position is for example determined based on received data from a GPS receiver 27 that can also be received via the input 21. A processing unit 24 ascertains 12 points of intersection of a line which is orthogonal to the vehicle movement and the detected road markings. The processing unit 24 ascertains 13 in addition points of intersection of the orthogonal line and road markings from a lane geometry map for the starting position determined for the vehicle, the points of intersection being filtered. For example, the points of intersection are filtered based on angles of direction of the points of intersection, based on traffic lane groups of the lane geometry map, or based on height information on the roads. Alternatively, all of the points of intersection are rejected in the case of overlapping roads in the lane geometry map. An evaluation unit 25 finally determines 14 the lateral position of the vehicle by comparing the ascertained points of intersection.

The lateral position of the vehicle determined by the evaluation unit 25 is made available for further processing via an output 28 of the device 20, for example for processing in a tracking system. It can also be saved in a memory 29 of the device 20, for example for later evaluation. The input 21 and the output 28 can be implemented as separate interfaces or as a combined bidirectional interface. The image processing unit 22, the position determining unit 23, the processing unit 24 as well as the evaluation unit 25 can be realized as dedicated hardware, such as integrated circuits. Of course, they can, however, also be partially or completely combined or implemented as software that runs on a suitable processor.

Figure 3:
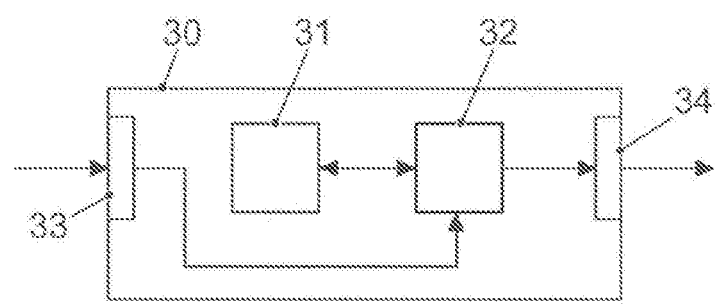
FIG. 3 shows a second exemplary embodiment of a device for determining a lateral position of a vehicle relative to the lanes of a road.

FIG. 3 shows a simplified schematic representation of a second exemplary embodiment of a device 30 for determining a lateral position of a vehicle relative to the lanes of a road. The device 30 has a processor 32 and a memory 31. For example, the device 30 is a computer or a workstation. Instructions are saved in the memory 31 that, when executed by the processor 32, cause the device 30 to execute the steps according to one of the described methods. The instructions saved in the memory 31 thus embody a program that can be executed by the processor 32 that realizes the method according to the present embodiments. The device has an input 33 to receive information. Data generated by the processor 32 are provided by an output 34. Moreover, they can be saved in the memory 31. The input 33 and the output 34 can be combined into a bidirectional interface.

The processor 32 can comprise one or more processor units such as microprocessors, digital signal processors, or combinations thereof.

The memories 29, 31 of the described embodiments can have volatile and/or non-volatile memory sections and can comprise a wide range of memory devices and media such as hard disks, optical storage media or semiconductor memories.

In the following, another embodiment will be described in detail. The method is based on a series of input data. First, the geometry and feature information of the visible road markings that are ascertained by the imaging sensor system are needed. In the following, these will be described as IP lines (IP for image processing). Likewise, absolute position information with direction and speed data is needed. This can be provided for example by the vehicle GPS. With regard to the absolute position information, distinction is provided in the present embodiment between absolute position information that represent the direct result of positioning by a GNSS system (GNSS—global navigation satellite system) (GNSS position data), and information that is interpolated based on previous GNSS positioning by dead reckoning (absolute position data). Optionally, relative, jump-free position information can also be used that for example is ascertained by means of movement estimation. In addition, map data with a high relative precision with regard to lanes and road markings are used. These are for example provided by a map data server 110. The map information will be described as DLM lanes (DLM—detailed lane model) and DLM lane markings in the following. Results may in an embodiment be included as history from the previous run or previous runs of the method, except in the first iteration, of course.

Figure 4:
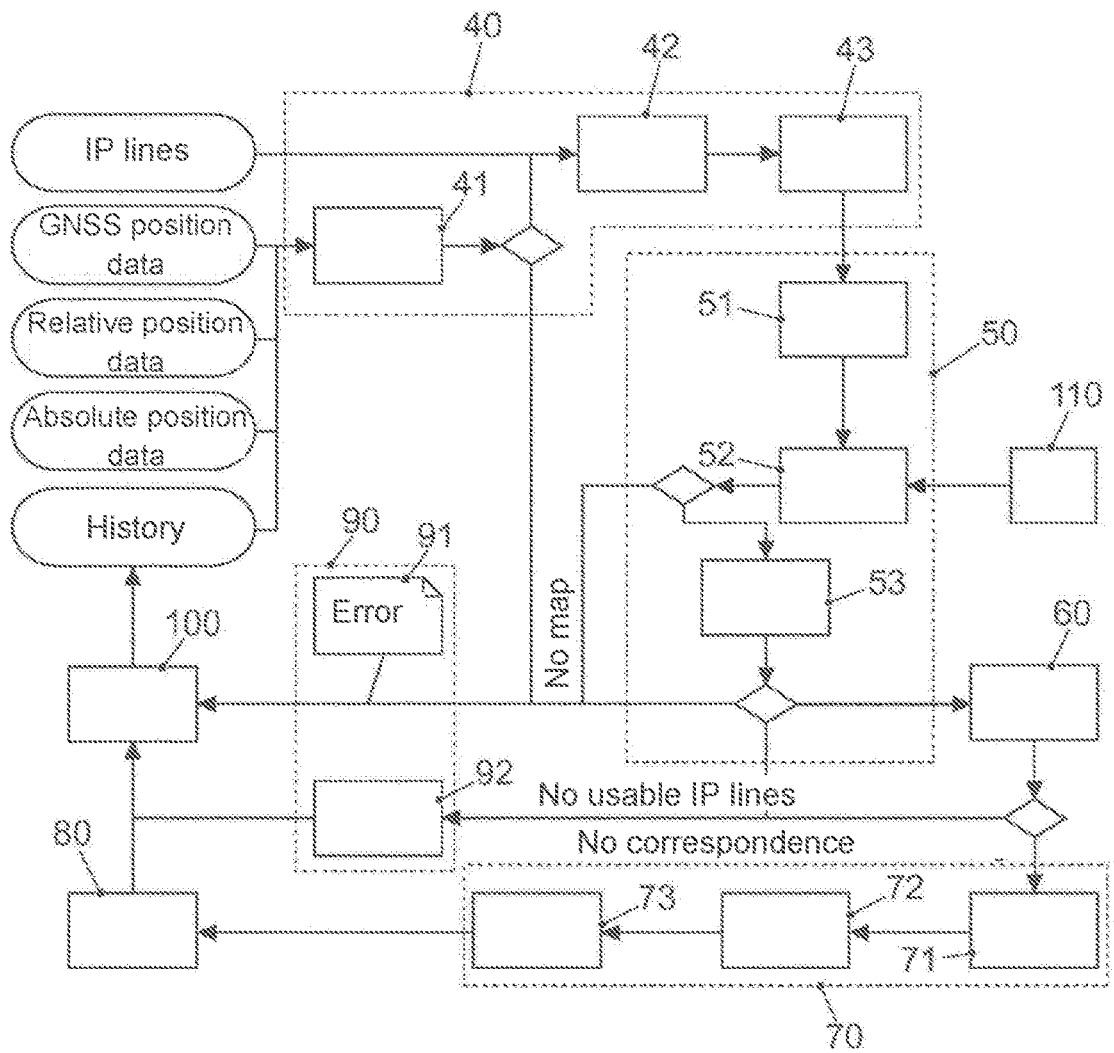
FIG. 4 shows an embodiment of the method shown in FIG. 1.

The principal run of the method is divided into several parts, some of which are joined into dashed-line blocks in FIG. 4.

In the context of preparing 40 the input data, an approximate vehicle position is determined 41. This serves as the starting position for comparing road markings with map data. Moreover, the geometries of the IP lines are recalculated and aggregated.

The geometries of the road markings detected by the camera system are typically described by clothoids in a vehicle-relative Cartesian coordinate system. The clothoid descriptions are converted into polylines that closely approximate the clothoid geometries. Conversion into polylines is done since the algorithms that subsequently operate on the road marking geometries are thus much easier to implement. In the present embodiment, the coordinates of the polylines are transferred from the vehicle-relative Cartesian coordinate system into the WGS84 coordinate system 42. The following algorithms operate in the WGS84 coordinate system since the map data and the vehicle position and movement information is also typically present in this coordinate system.

The geometries of the road markings recognized by the camera system start shortly in front of the vehicle and have an extent of a few meters approximately in the driving direction/camera viewing direction. Occasionally, road markings are initially correctly recognized and transferred by the camera system, but no longer detected shortly thereafter.

The IP lines available in an algorithm iteration are therefore always buffered and compared 43 with the new geometries transmitted by the camera system in the next iteration.

Subsequently, essential geometric features are extracted 50. For this, first a section of a configurable length orthogonal to the axis of the vehicle movement is constructed 51 at a configurable distance in front of the starting position. The perpendicular to the starting position on this section is located in the middle of the section.

The length of the section should be chosen large enough for points of intersection of the section to result with both the IP lines as well as with the DLM lane markings corresponding to the respective IP lines, including for IP lines with a very large lateral distance to the vehicle (up to the maximum distance in which the employed camera system still detects IP lines). Usefully, when the section intersects an IP line, it also intersects with the DLM lane marking corresponding to this IP line, and vice versa. This is most reliably achieved by choosing a section length sufficiently large enough for all of the road markings still recognizable by the camera, and all DLM lane markings that correspond to road markings still recognizable by the camera, to be intersected by the section. However if the chosen value is too large, it unnecessarily costs additional computing time.

Figure 5:
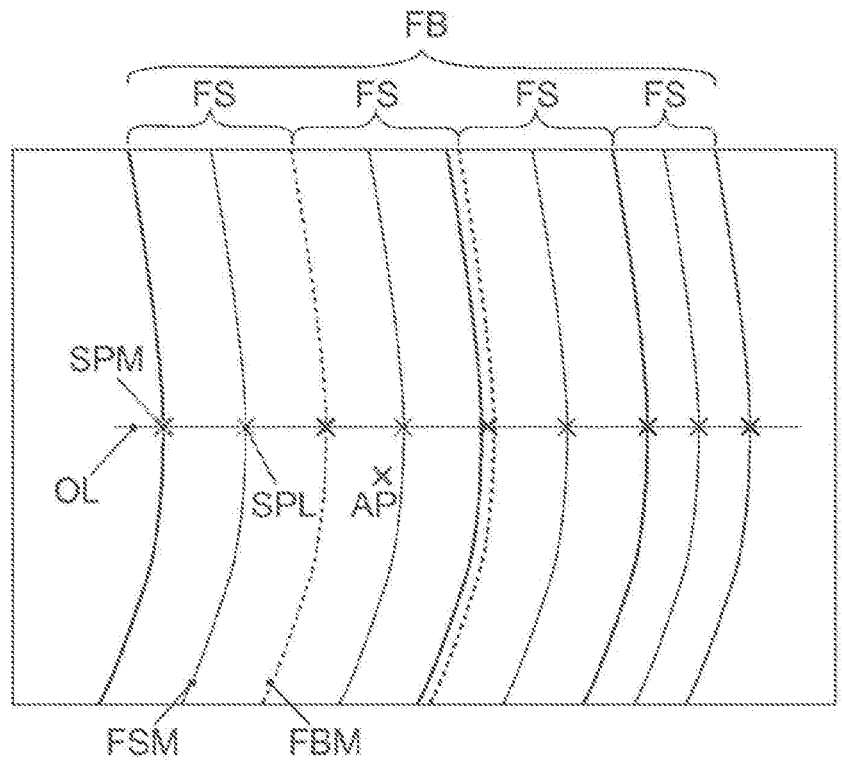
FIG. 5 shows an example of ascertained map points of intersection.

Then the points of intersection of the DLM lane markings and the DLM lanes with the orthogonal section are ascertained 52, and both together are designated as map points of intersection. An example of such map points of intersection is shown in FIG. 5. A road FB with four traffic lanes FS which are spaced from each other by road markings FBM as well as the associated traffic lane middle FSM can be seen. Also shown are the starting position AP, the constructed orthogonal line OL and the map points of intersection, divided according to points of intersection SPM with the DLM lane markings (marking point of intersection), and points of intersection SPL with the DLM lanes (lane point of intersection). For each map point of intersection, its lateral position relative to the vehicle, such as the distance from the midpoint of the orthogonal section and, in the case of DLM lane markings, the information on the type of associated road marking (dashed/solid line, guard barrier, road edge, . . . ) may be retained.

Figure 6:
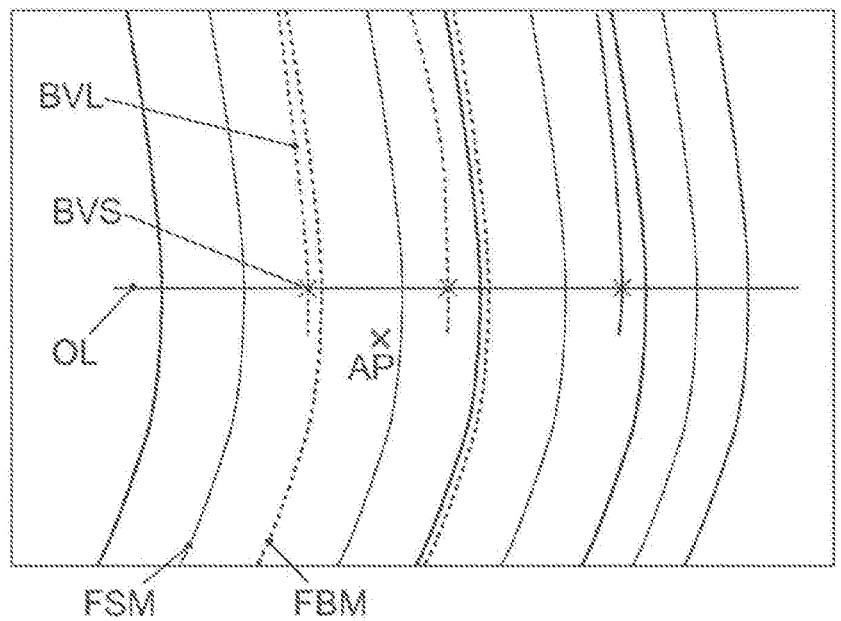
FIG. 6 shows an example of ascertained image processing line points of intersection.

In another step, the points of intersection are formed of the orthogonal section with the IP lines 53 designated as IP line points of intersection. An example of such IP line points of intersection is shown in FIG. 6. In addition to the elements which are already known from FIG. 5, the recognized IP lines BVL and the points of intersection BVS of the orthogonal line OL with the recognized IP lines BVL can also be seen. In addition, the lateral position of each point of intersection BVS relative to the vehicle and the information on the type of recognized traffic lane marker (dashed/solid line, guardrail, road edge . . . ) may be retained.

If the road driven by the vehicle and the associated oncoming road overlap with traffic lanes of other roads in the two-dimensional map geometry, for example in the case of bridges or underpasses, only the map points of intersection of the driven road, the associated oncoming road and, if applicable, the associated accesses and exits are ascertained. The map points of intersection with the overlapping traffic lanes should be ignored.

Figure 7:
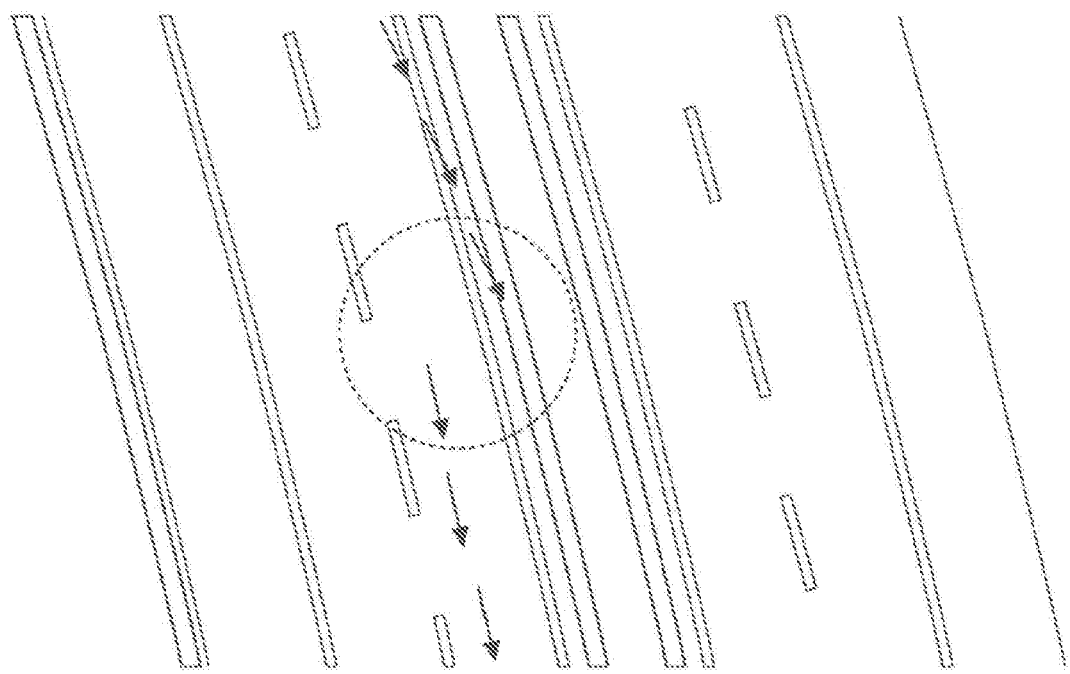
FIG. 7 shows an example of a sudden correction of position, direction of movement and speed by a GPS system.

An approach for this uses an angle comparison. Map points of intersection, the direction angles of which differ by more than a configurable value from the jump-free route angle, are filtered out. This configurable threshold value will be designated in the following an angle filter threshold value. The direction angle is viewed modulo 180° in order to take into account the oncoming road. The direction angle of a point of intersection is understood to be the direction angle of the intersected DLM geometry at the point of intersection, i.e., the direction angle of the middle of the traffic lane, or the traffic lane border (dashed/solid line, guard rail, road edge . . . ). The jump-free route angle is an error-purged route angle, in particular purged of sudden position and direction corrections by the GPS system. Many GPS systems have the property of occasionally correcting deviations in a sudden manner. An example of this is shown in FIG. 7. The arrows visualize the position, movement direction and speed as received by the GPS system. In the region highlighted by the dashed oval, there is a sudden correction in the position and direction of movement by the GPS system. In order to match relative (odometer) and absolute (GPS) positioning information, the movement directions of both input data must be matched. In order to compensate for any sudden changes in direction by the GPS system and the accumulation of imprecisions in the direction information of the relative positioning information, the approach of the jump-free route angle was drafted. Basically, the approach includes smoothing the differences between the direction information of absolute and relative positioning information, for example using an exponentially smoothed floating mean. In the implementation of the method, a distinction is not drawn between the yaw angle and route angle of the vehicle.

The difference between these angles is assumed to be sufficiently small, and the viewing direction of the camera is equated with the movement direction of the vehicle corresponding to the jump-free route angle. A precise differentiation between the route and yaw angle is unnecessary in the achieved precisions.

Figure 8:
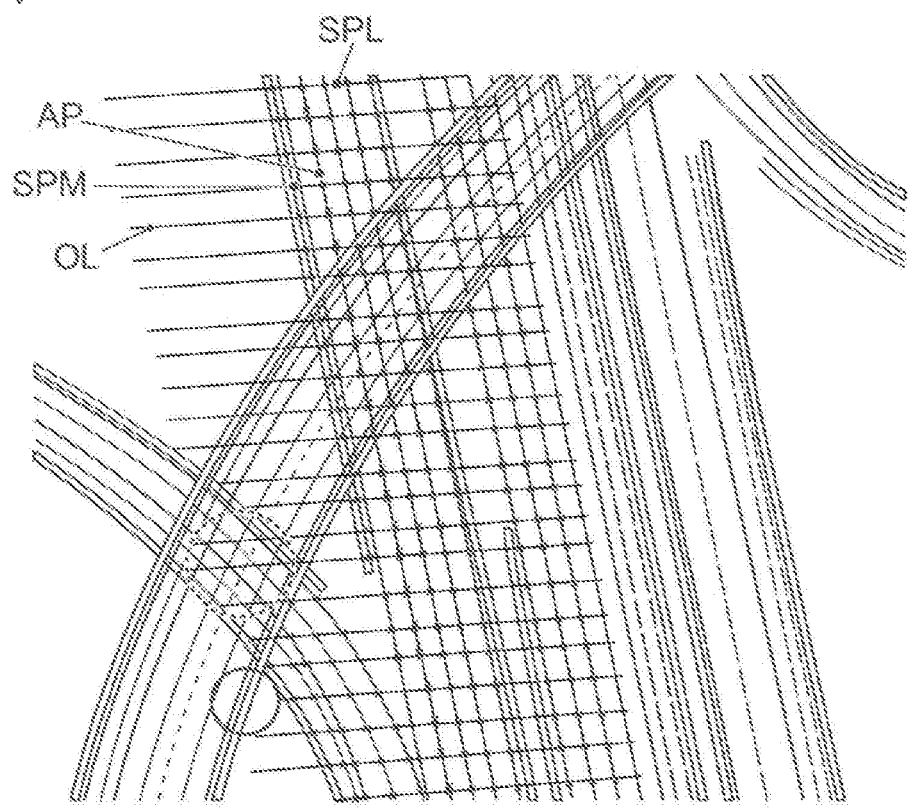
FIG. 8 represents an example of the map points of intersection for a highway with an angle filter threshold value of 20°.
Figure 9:
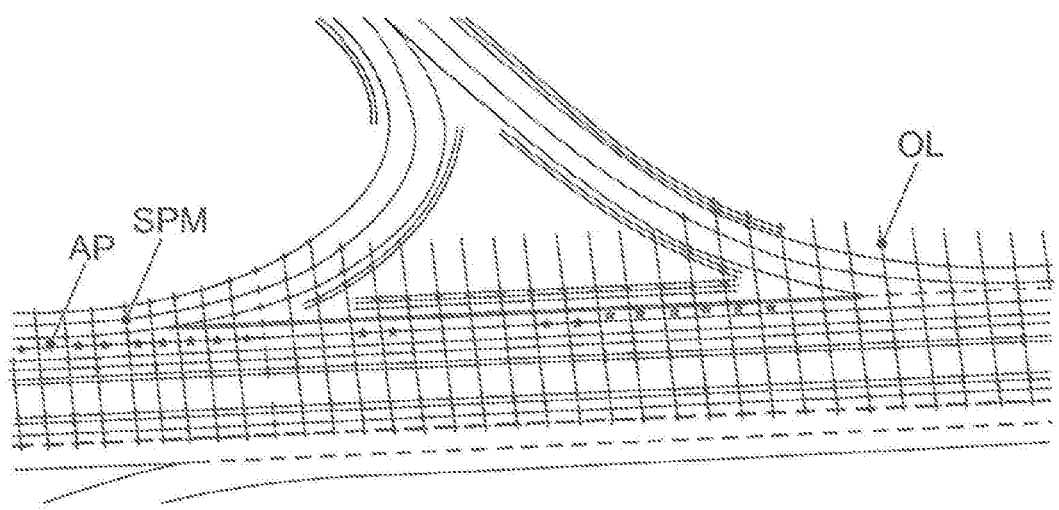
FIG. 9 represents an example of the map points of intersection for a federal highway with an angle filter threshold value of 45°.

With an angle filter threshold value of about 20°, all potentially problematic map points of intersection of overlapping roads are generally filtered out on highways, but all relevant map points of intersection of accesses and exits and similar roads are, however, included. An example of this is shown in FIG. 8. On other roads besides highways, the curve radii of accesses and exits and similar roads are generally so tight that an angle filter threshold value of at least 40° should be selected. An example of this is shown in FIG. 9. In FIG. 8 and FIG. 9, the stars mark the respective starting positions AP, and the crosses mark the map points of intersection SPM, SPL that are recognized as valid. The respective orthogonals OL are also drawn in.

The dashed-line circle in FIG. 8 marks a region in which map points of intersection of the access that is located on the same plane as the traveled road were unintentionally filtered out. Since the region is so far distant from the road that the camera would typically not detect any of the road markings at the locations of the unrecognized points of intersection, filtering out these points of intersection does not pose any problem to performing the method.

The solid-line circle in FIG. 8 marks a region in which map points of intersection of the overpass that is located on a different plane as the traveled road were not filtered out as intended. Since this region is further from the camera then all of the points of intersection of roads on the same plane as the traveled road that are relevant for comparison, retaining these map points of intersection is not a problem to performing the method.

The described approach is unsuitable for road routes in which a plurality of roads run parallel in different planes over each other.

Undesirable map points of intersection in overlapping roads can also be filtered out by matching IDs of traffic lane groups instead of by comparing angles.

Figure 10:
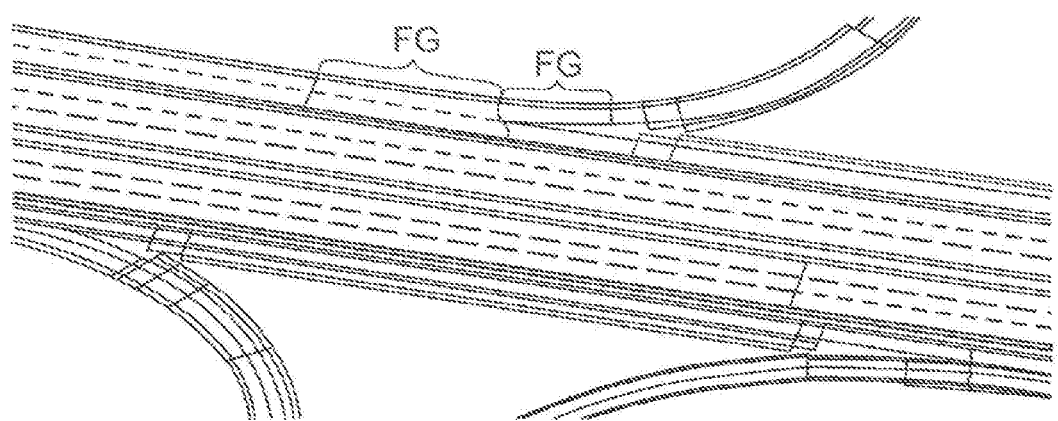
FIG. 10 illustrates the concept of traffic lane groups.

A map section with traffic lane geometries and traffic lane groups is shown in FIG. 10. "Traffic lane group" is the designation for the DLM/map segment. Each traffic lane segment is assigned to just one traffic lane group FG. All traffic lane segments of a group belong to the same road and run in the same direction. At a maximum, a traffic lane group exists as long as the quantity of traffic lane segments represented in the group and their properties, i.e., the associated road markings and the traffic lane type, stay the same. Once an access or exit starts or ends, a dashed line becomes a solid line or a guard rail begins next to the road, a new traffic lane group begins. If an access meets a street or separates therefrom, two previously separate traffic lane groups transition into a single traffic lane group, or one traffic lane group separates into two traffic lane groups.

A traffic lane segment represents the section of a traffic lane that is contained in just one traffic lane group. A traffic lane segment therefore always only exists long enough as predetermined by the traffic lane group in which it is contained. The traffic lane segment is designated the "following segment" that represents the continuance of a traffic lane segment corresponding to the traffic lane route. With a traffic lane segment A that belongs to the same traffic lane as a traffic lane segment B, and B directly borders A and continues A in the driving direction, B is the following segment to A. When transitioning from one traffic lane into two traffic lanes, the traffic lane segment divides into two traffic lanes segments corresponding to the original traffic lane at the border between the traffic lane groups, typically both with the traffic lane type "merge". Both traffic lane segments are considered following segments of the original traffic lane segment. Conversely, when transitioning from two traffic lanes into one traffic lane, two independent traffic lane segments, typically both with the traffic lane type "merge", have the same following segment.

A unique traffic lane index within the traffic lane group in which it is contained is assigned to each traffic lane segment. The traffic lane index starts with the traffic lane segment at the far right with 0, and is incremented by 1 with each traffic lane segment to the left. Equivalence of the traffic lane index of two traffic lanes segments in sequential traffic lane groups is neither a sufficient nor necessary condition for a traffic lane segment being a following segment of the other traffic lane segment. For example, emergency lanes or "unknown traffic lanes" can be added or omitted on the right side, or the traffic lanes lying furthest to the right can separate or combine at accesses and exits.

If points of intersection to map geometries of a traffic lane group with intermediate points of intersection of another traffic lane group are on the orthogonal, and neither of the two traffic lane groups contains subsequent segments from the other one, these traffic lane groups must overlap. Accordingly, intersecting roads must be imaged on different planes. If one of the overlapping traffic lane groups belongs to the road, map points of intersection of the traffic lane groups that overlap in this case can be ignored.

If two traffic lane groups overlap of which neither belongs to the traveled road, at least one of the two traffic lane groups (or one previous or following traffic lane group close to this traffic lane group) accordingly also overlaps in great probability with one of the traffic lane groups of the traveled road. Correspondingly, the map points of intersection of each traffic lane group to which this applies can be ignored. If this does not apply to the others, their map points of intersection should be included (under the assumption that the overlap only has two planes). To support overlaps with more than two planes, the method can be performed by matching the overlaps in pairs.

If the map data provides height information on the roads, it can be additionally ascertained by comparing the height information of which traffic lanes are at same height as the traveled road and consequently must be included in the quantity of map points of intersection.

Since the height information ascertained by GNSS systems has a comparatively low precision, it is recommendable to not derive the height of the vehicle based on the position information from the GNSS system, but rather to initially routinely determine the traffic lane as described below at road sections without overlapping roads. The height information can then be derived from the height data of the ascertained road saved in the map data.

An alternative approach for handling overlapping roads consists of rejecting all map points of intersection of sections with overlapping roads and instead only perform measures to preserve and interpolate already collected information. To the extent that overlapping roads only occur briefly, and particularly when the vehicle movement can be estimated very precisely over short periods by using jump-free relative position information, the method can be suspended.

Returning to FIG. 4, a quantity of possible vehicle positions is determined 60 based on a comparison of the ascertained points of intersection. These are then evaluated subsequently by a sequence of corresponding evaluation functions 70, wherein the possible vehicle positions may be supplemented or modified. Penalty points are issued with the assistance of the evaluation functions. An initial evaluation function 71 considers the assignment of the line types ascertained by the camera to the line types saved in the map. In some embodiments, a configurable matrix is provided for this evaluation that can be assigned a specific value for each combination of IP line and map road marker type. Accordingly, frequently occurring wrong assignments of the camera, such as the recognition of a solid line as a dashed line can be associated with only a slightly poor evaluation;

improbable wrong assignments of the camera, such as recognition of a road edge as a guardrail, can be associated with a much worse evaluation. A second evaluation function 72 takes into account the history of the vehicle positions. Potential vehicle positions that deviate strongly from the history are for example characterized with high penalty points. In the present embodiment, a third evaluation function 73 evaluates the lane type. The vehicle is assumed to be on a regular traffic lane of the road. Possible vehicle positions on traffic lanes that are not intended to be driven (hard shoulders, "unknown traffic lanes" of the DLM and emergency lanes, etc.) are therefore poorly evaluated; potential vehicle positions on drivable traffic lanes are evaluated neutrally. As another example, much higher penalty points are assigned to potential vehicle positions on the opposing road than for positions in the direction of travel. The adjustment of penalty points depends on the sensor system used and the employed digital map. Accordingly, a specific adaptation for the system used can be very easy. As a result of the evaluation method, the best evaluated possible vehicle position is then selected 80.

During the course of the method, it can occur at various points that a position cannot be determined and the process cannot be continued given the absence of input data or insufficient quality of the input data. In such cases, it is possible to leave the modular process at the corresponding location and initiate error handling 90, such as generating a result without position information, or with approximate position information determined in another way.

In FIG. 4, the paths of the regular route are identified by solid lines; the paths in the case of a deviation from the regular route are indicated by dashed arrows.

For example when map data are not available for the current vehicle position according to absolute position information, there is no ascertainment of the possible vehicle positions. When absolute position information (such as no GNSS reception due to buildings) is missing, the absolute position information can be replaced by earlier absolute position information and relative position information when relative position information is available. If the relative position information is not available, the possible vehicle positions are not ascertained when absolute position information is missing. In such cases, a corresponding error state is output 91. If in contrast insufficient IP lines are recognized, no sufficiently good assignment of the DLM lane markings to IP lines can be found, or no single possible vehicle positions were ascertained, approximately determined position information can be ascertained with the assistance of a map-based method 92. One possibility is for example to assume a continuation of the vehicle movement along the middle of the lane according to a map. In a subsequent step 100, the results are prepared, provided for further processing, and transferred to the history.

REFERENCE NUMBER LIST

10 Detect road markings
11 Determine a starting position for the vehicle
12 Ascertain points of intersection for detected road markings
13 Ascertain and filter points of intersection for road markings of the lane geometry map
14 Determine the lateral vehicle position by comparing the points of intersection
20 Device
21 Input
22 Image processing unit
23 Position determining unit
24 Processing unit
25 Evaluation unit
26 Camera unit
27 GPS receiver
28 Output
29 Memory
30 Device
31 Memory
32 Processor
33 Input
34 Output
40 Prepare the input data
41 Determine an approximate vehicle position
42 Transfer to WGS84 coordinate system
43 Match the retransmitted geometries
50 Extract geometric features
51 Construct an orthogonal line
52 Ascertain map points of intersection
53 Ascertain points of intersection with IP lines
60 Ascertain possible vehicle positions
70 Evaluate the possible vehicle positions
71 First evaluation function
72 Second evaluation function
73 Third evaluation function
80 Selection of the best evaluated vehicle position
90 Error handling
91 Output an error status
92 Map-based method
100 Prepare the results
110 Map data server
FB Road
FS Traffic lane
FSM Traffic lane middle
FBM Road marking
OL Orthogonal line
SPM Marking point of intersection
SPL Lane point of intersection
AP Starting position
BVL IP line
BVS Point of intersection with IP line
FG Traffic lane group The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for determining a lateral position of a vehicle relative to the lanes of a road, having the steps of:
   detecting road markings;
   determining a starting position for the vehicle;
   ascertaining points of intersection of a line orthogonal to the vehicle movement with the detected road markings;
   ascertaining points of intersection of the orthogonal line with road markings from a lane geometry map for the starting position determined for the vehicle; and determining the lateral position of the vehicle by comparing the ascertained points of intersection;
wherein points of intersection are filtered when ascertaining the points of intersection of the orthogonal line with road markings from the lane geometry map.

2. The method according to claim 1, wherein the filtering of the points of intersection is based on direction angles of the points of intersection.

3. The method according to claim 2, wherein those points of intersection are filtered out whose angles of direction deviate by more than one angle filter threshold value from a route angle of the vehicle.

4. The method according to claim 3, wherein the angle filter threshold value is dependent on the street type.

5. The method according to claim 1, wherein the filtering of the points of intersection is based on traffic lane groups of the lane geometry map.

6. The method according to claim 5, wherein only those points of intersection are retained that belong to a traffic lane group that belongs to the traveled road.

7. The method according to claim 1, wherein the filtering of the points of intersection is based on height information on the traffic lanes.

8. The method according to claim 7, wherein only those points of intersection are retained that belong to traffic lanes which are located at the same height as the traveled road.

9. The method according to claim 1, wherein all points of intersection are rejected when filtering the points of intersection when there are overlapping roads in the lane geometry map.

10. An autonomous or manually controlled vehicle, wherein it is configured to execute a method according to claim 1.

11. A device for determining a lateral position of a vehicle relative to the lanes of a road, wherein the device comprises:
a processor, configured for detecting road markings and for determining a starting position for the vehicle;
wherein the processor is further configured for
for ascertaining points of intersection of a line which is orthogonal to the vehicle movement and the detected road markings and for ascertaining points of intersection of the orthogonal line with road markings from a lane geometry map for the starting position determined for the vehicle;
for determining the lateral position of the vehicle by comparing the ascertained points of intersection;
wherein the processor is further configured to filter the points of intersection when ascertaining the points of intersection of the orthogonal line with road markings from the lane geometry map.

12. An autonomous or manually controlled vehicle, wherein it has a device according to claim 11.

13. A non-transitory computer-readable storage medium with instructions that, while being executed by a computer, cause the computer to execute the following steps:
detecting road markings;
determining a starting position for the vehicle;
ascertaining points of intersection of a line orthogonal to the vehicle movement with the detected road markings;
ascertaining points of intersection of the orthogonal line with road markings from a lane geometry map for the starting position determined for the vehicle; and
determining the lateral position of the vehicle by comparing the ascertained points of intersection;
wherein points of intersection are filtered when ascertaining the points of intersection of the orthogonal line with road markings from the lane geometry map.

* * * * *